US006637099B1

(12) United States Patent
Seewraj

(10) Patent No.: US 6,637,099 B1
(45) Date of Patent: Oct. 28, 2003

(54) RIVETING APPARATUS

(75) Inventor: Angraj Kumar Seewraj, Welwyn Garden (GB)

(73) Assignee: Textron Fastening Systems Limited (GB)

( * ) Notice: Subject to any disclaimer, the term of this patent is extended or adjusted under 35 U.S.C. 154(b) by 0 days.

(21) Appl. No.: 09/700,007

(22) PCT Filed: Jun. 24, 1999

(86) PCT No.: PCT/GB99/01986

§ 371 (c)(1), (2), (4) Date: Dec. 20, 2000

(87) PCT Pub. No.: WO99/67043

PCT Pub. Date: Dec. 29, 1999

(30) Foreign Application Priority Data

Jun. 25, 1998 (GB) .............................................. 9813683

(51) Int. Cl.[7] ............................ B21J 15/28; B21P 9/05; B23P 11/00; B21D 9/05

(52) U.S. Cl. ................... 29/812.5; 29/243.53; 72/391.6

(58) Field of Search ........................ 72/391.6; 29/812.5, 29/243.53, 243.523

(56) References Cited

U.S. PATENT DOCUMENTS 2,340,066 A * 1/1944 Lee ........................... 72/391.6
3,557,597 A * 1/1971 Helsop et al. ............. 29/812.5
3,717,023 A * 2/1973 Prosser et al. ............. 72/391.6
3,828,603 A * 8/1974 Sheffield et al. ........... 72/391.6
4,506,536 A * 3/1985 Clarke et al. .............. 29/812.5
5,104,024 A * 4/1992 Brewer et al. ............. 72/391.6
5,390,524 A * 2/1995 Higgs ......................... 72/391.6
5,634,264 A * 6/1997 Dear et al. ................. 29/812.5
5,778,516 A * 7/1998 Dear et al. ................. 72/391.6

FOREIGN PATENT DOCUMENTS

FR 2322310 * 3/1977
GB 451396 * 8/1936
GB 1183049 * 3/1970
GB 2299288 * 2/1996

* cited by examiner

*Primary Examiner*—David B. Jones
(74) *Attorney, Agent, or Firm*—Trexler, Bushnell, Giangiorgi, Blackstone & Marr, Ltd.

(57) ABSTRACT

A riveting apparatus is described, including a body having an abutment means (19,32) mounted at one end thereof, and stop means (52,53) mounted at a position remote therefrom, so that a mandrel (30) inserted through the abutment means (19,32) has it end remote from the head located axially by the stop means (52,53) in predetermined axial relationship to the body, characterized in that the abutment means (19,32) is adjustable with respect to the body in the direction along the mandrel axis, thereby to provide adjustment of the relative positions of the abutment (19,32) and the mandrel head (33). A pneumatic piston means for use in the rivet feeding means (55) in the riveting apparatus is also described.

8 Claims, 3 Drawing Sheets

RIVETING APPARATUS

BACKGROUND OF THE INVENTION

This invention relates to riveting apparatus of the type whereby a plurality of tubular rivets may be set in succession by drawing through the bore of each one of the rivets in turn an enlarged head of a riveting mandrel while the rivet is supported by an abutment. Access to only one side of the workpiece is needed, so such rivets are commonly referred to as blind rivets.

Such rivets are well known and widely available under the Registered Trademarks CHOBERT, BRIV and RIVSCREW.

More particularly the invention relates to riveting apparatus of the type in which an elongated mandrel, having an enlarged head at one end and loaded with a plurality of the tubular rivets forming a column of rivets on the mandrel, is gripped by gripping means at or near the end remote from the head, and reciprocated relative to an abutment by relative reciprocation between the gripping means and the abutment, the rivets in the column being fed forwardly along the mandrel so that the leading rivet nearest the mandrel head is positioned between the mandrel head and the abutment and can then be set by moving the mandrel rearwardly relative to the abutment so as to draw the head of the mandrel through the bore of the rivet while the rivet is supported by the abutment. Such apparatus is hereinafter referred to as "riveting apparatus of the type defined".

The abutment is usually provided by a nosepiece comprising jaws between which the mandrel extends, and which are separable to allow rivets which are fed forwardly along the mandrel to pass between them, the jaws being spring urged to close together behind a fed rivet which has passed forwardly of the jaws, and to resist rearward movement of the fed rivet. Examples of such riveting apparatus is described in our earlier patent specifications GB 1183049 and GB 2299288, the contents of which are incorporated herein by reference, and to which the reader is referred for an understanding of the field of the present invention.

Such riveting apparatus is well known and much used in the mechanical assembly industry. Examples are widely available under the designations AVDEL 717 Series, AVDEL 727 Series and AVDEL 753 Series (AVDEL is a Registered Trade Mark).

As mentioned, a column of rivets is provided on the mandrel. Typically the column comprises up to about fifty rivets, depending on the length of the rivet. When all of the rivets on the mandrel have been set, use of the apparatus must be temporarily stopped, whilst the mandrel is removed from the apparatus, reloaded with a new column of rivets, and then re-inserted in the apparatus.

Such repeated interruption of the use of the apparatus is very inconvenient under modern production-line conditions, where all stages of the production manufacturing process must be carried out as near continuously as possible with the minimum of interruption.

It is therefore desirable to reduce, as far as possible, the time which it takes an operator to reload a tool. Our previous GB 2299288 describes a number of features which enable the tool reload time to be reduced.

In order to make the rivet setting operation of the tool efficient, one requirement is that, at the start of each rivet-setting stroke of the mandrel, the leading rivet between the mandrel head and the abutment, which is about to be set, has one end in contact with the mandrel head and its other end spaced from the abutment by the minimum distance needed in order to allow the abutment jaws to close behind the rivet after it has been fed through the jaws. This ensures that the minimum initial part of the mandrel stroke is wasted, thereby minimising waste of time and energy. In practical terms, this means that it must be possible to insert the mandrel into the tool in such a way that its head is positioned in the correct relationship to the abutment. Our prior GB 2299288 describes on pages 24 and 25, with reference to FIG. 4D, a means of achieving this by providing a stop at the end of the tool remote from the abutment against which the tail end of the mandrel (i.e. the end remote from the head) abuts, the position of this stop being adjustable in the direction along the mandrel axis. It will be appreciated from the aforementioned description that the construction of that adjustable stop assembly is complicated, and that adjusting it is an awkward operation for the operator.

The tool described in the following example embodiment of the present invention provides a simpler arrangement for adjusting the initial relative positions of the abutment and mandrel head.

SUMMARY OF THE INVENTION

Accordingly, the present invention provides, in one of its aspects, riveting apparatus as set out in claim 6.

In the mandrel described in the following example, the tail end of the mandrel is slightly enlarged radially, for example by a crimping operation. However, the means used to feed the column of rivets forwardly along the mandrel is commonly a pneumatic piston with a bore through which the tail end of the mandrel is inserted, as described for example in our prior GB 1183049 and GB 2299288. Since the bore in the piston should be a sufficiently close fit around the mandrel stem that no air (or a minimal quantity of air) escapes between them, initial passage of the tail-end enlargement of the mandrel through the bore of the rivet-feeding pneumatic piston presents a problem. The tool described in the following example incorporates a rivet-feeding device which seeks to overcome this problem.

Accordingly, the present invention provides, in another of its aspects, rivet feeding means as set out in claim 1.

BRIEF DESCRIPTION OF THE DRAWINGS

A specific embodiment of invention will now be described by way of example and with reference to the accompanying drawings, in which.

DETAILED DESCRIPTION OF THE DRAWING

Figure 1:
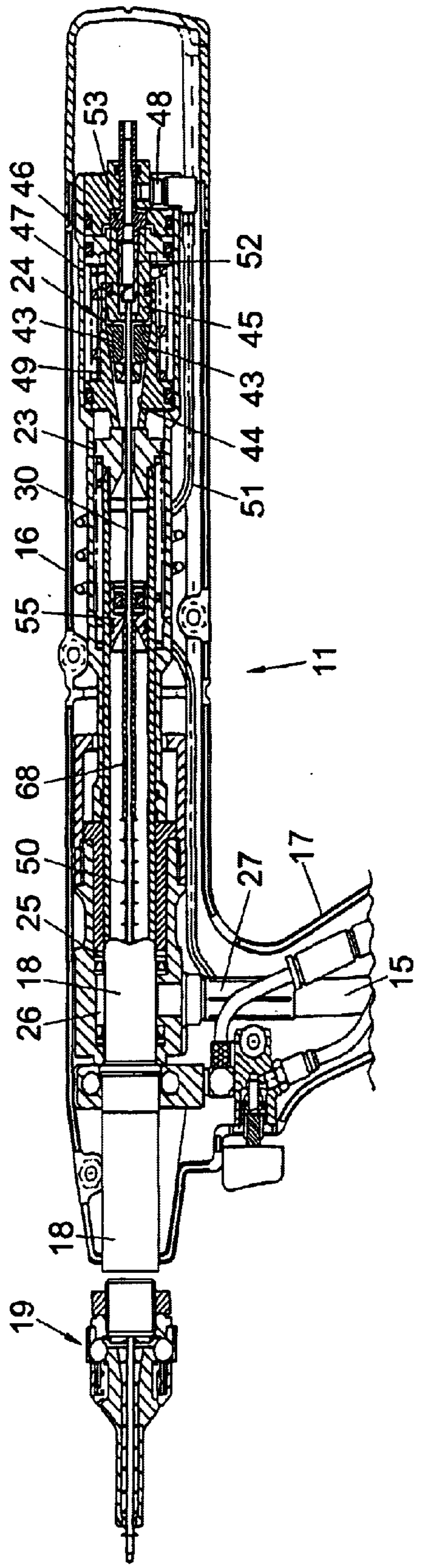
FIG. 1 is a longitudinal axial section through a riveting tool.

The riveting apparatus of this example is generally similar in construction and operation to that described in our GB 2299288, to which the reader is referred.

The riveting apparatus of this example comprises a hand-held riveting tool 11 and a pneumatic control equipment cabinet (not shown) to which it is connected by means of a pneumatic multiway connection (not shown). The tool of the present example has a totally pneumatic control system. The mandrel-retraction means within the tool is hydraulically operated and the tool is therefore also connected by means of a hydraulic hose 15 to a hydro-pneumatic intensifier (not shown).

The hand-held tool 11 contains all the mechanical parts of the rivet placing apparatus, together with the appropriate parts of the hydraulic system and pneumatic control system. It has its various parts built into a housing which basically comprises a, cylindrical part 16 and integral pistol grip 17. The housing part 16 contains a tool body in the form of a front barrel 18, on the forward end of which is mounted the abutment assembly in the form of a nose-jaw assembly 19, which is located outside the housing body 16. On the outside of the rearward end of the barrel 18 is mounted a rear barrel 23, for limited reciprocation with respect to the inner barrel 18. On the rear end of the rear barrel 23 is mounted the mandrel-gripping device in the form of a tail-jaw assembly 24, for gripping the tail end of the mandrel 30, on which are loaded a number of rivets 50.

The front end of the rear barrel 23 is connected to annular piston 25 which reciprocates in a hydraulic slave cylinder 26. This hydraulic slave cylinder 26 is connected via a hydraulic connector 27 to a hydraulic hose 15 and thence to the hydraulic intensifier. The piston and cylinder assembly 25, 26 provide power means for retracting the mandrel-gripping device.

Figure 2:
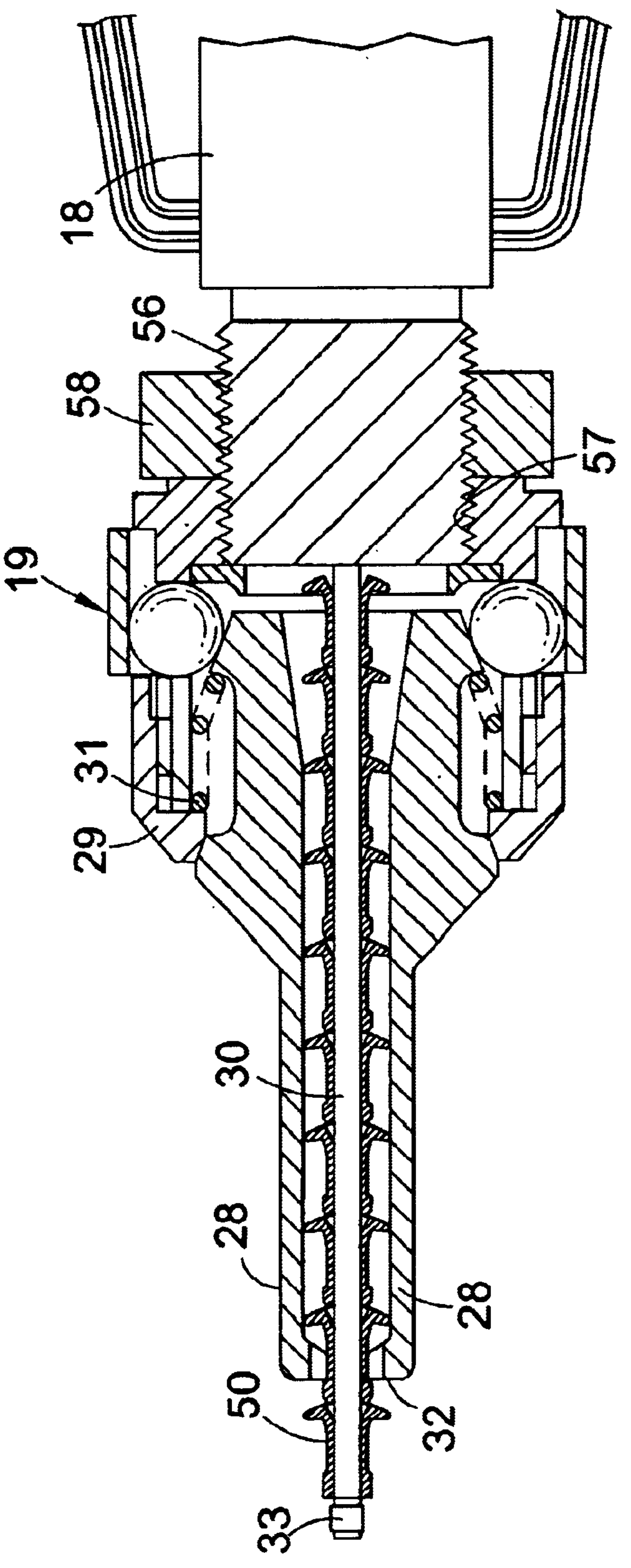
FIG. 2 is an enlargement of the left hand part of part of FIG. 1, showing the abutment means.

The nose jaw assembly 19 is mounted on the forward end of the barrel 18. Essentially it comprises two jaws 28, 28 (FIG. 2). The jaws are urged rearwardly into a holder 29 by a spring 31, and the shape of the holder and jaws is such that the rearward urging of the spring urges the front ends of the jaws together (FIG. 2). When closed, the front end faces of the two jaws co-operate to provide an annular abutment or anvil 32. The jaws can be opened against the urging of the spring 31 by a leading rivet pushed forwardly through them by the rivet feeding means. The jaws can also be opened and closed manually, for the purpose of removing and replacing the mandrel.

The mandrel gripping and retracting means as previously mentioned comprises the tail-jaw assembly 24 and the piston and cylinder assembly 25, 26. The tail jaw assembly 24, as is usual in this type of tool, comprises a pair of hardened steel tail jaws 43 carried in a jaw carrier 45, the outside faces of the jaws being tapered and cooperative with a tapered collet 44. The jaw carrier 45 is urged forwardly towards the mandrel 30 (i.e. to the left as viewed in FIG. 1) by means of a tail jaw pneumatic closing device comprising a piston 46 sliding within a cylinder 47 which forms part of the rear end of barrel 23. When air pressure is applied to the rear of the piston 46 through a connector 48, to which tail jaw air line 51 is connected, the jaw carrier 44 is urged forwardly to close the tail jaws 43 on to the mandrel 30 as previously described. When the air pressure is removed from the rear of the piston 46, a spring 49 urges the jaw carrier 44 rearwardly, thus releasing the tail jaws 43 from the mandrel.

The apparatus of this example is also provided with mandrel locating means for locating the axial position of the rear or tail end of a mandrel of known pre-determined length. It comprises a movable stop member 52 (in the form of a piston which is largely hollow to save weight and thereby increase its speed of movement), which can reciprocate in a bore within the jaw carrier 45, in combination with a second stop member 53. The second stop member 53 is provided by a plug member screwed into the rear of the jaw carrier 45. The second stop member 53 is thus fixed in position in relation to the outer barrel 23, and, when the mandrel retracting means is in its forward position, also in relation to the inner barrel 18. When a mandrel 30 is inserted through the nose jaws 28, so that its rear end pushes the stop member 52 back into contact with the stop 53, the axial position of the mandrel 30 with respect to the barrel 18 is at a predetermined position. The movable stop member 52 is reciprocable so that, in the absence of a mandrel, it moves forwards and shuts off the air feed to the rivet-feeding means, as described in GB 2299288.

The tool of this example is also provided with pneumatically-operated rivet feeding means, in the form of a pneumatic piston assembly 55, which has a central bore through which the mandrel 30 extends. The piston is a sliding fit in the inner fixed barrel 18. Air under pressure is supplied to the rear of the piston 55 around and along the outside of the movable stop member 52, and then past the jaws 43. A spacer 68 in the form of a length of plastic tube is provided to ensure that the rearmost rivets are fed past the jaws.

As thus far described, the tool of the present example is similar in construction and operation to that described in GB 2299288, with the exception that the mandrel location means is not adjustable. However the tool of the present example has two important differences over the prior art tool.

Firstly, the abutment means 19 is adjustable with respect to the tool body in the direction along the mandrel axis. The means by which this is achieved is shown in FIG. 2. The forward end of fixed barrel 18 is externally threaded at 56, and the interior of the rear part of the jaw assembly 19 is internally threaded at 57. The position of the jaw assembly 19, and thus of the abutment anvil face 32, can be adjusted axially with respect to the barrel 18, and thus with respect to the mandrel 30, by rotating the jaw assembly 19 with respect to the barrel 18. An adjustment range of about 3 mm is sufficient. A lock nut 58 is provided to lock the nose assembly 19 in its selected position, to provide the desired distance between the abutment anvil face 32 and the mandrel head 33, for the purpose previously mentioned.

The mandrel of the present example also differs from that described in GB 2299288. As previously mentioned, one way of speeding up the tool reloading process is to eliminate the step of loading further rivets on to the mandrel, after it has been removed from the tool, by providing a supply of mandrels each preloaded with a column of rivets. After all the rivets on the mandrel have been set, the mandrel is removed from the tool and is thrown away or disposed of, this being termed a "disposable mandrel". Since the disposable mandrel is intended to be inserted into the tool and used only once, to set only the number of rivets preloaded on to it (typically up to fifty), instead of being reloaded and reused many times to set a total number of rivets extending into thousands, or maybe tens of thousands, it need not be so strong and fatigue-resistant as a prior art reloadable mandrel. It is thus necessary to prevent reloading and reuse of a disposable mandrel, which could be potentially dangerous. Furthermore, it is necessary to retain the column of rivets preloaded on the disposable mandrel, after the preloading operation at their point of manufacture, during transport, handling, and loading into the riveting tool.

Figure 3B:
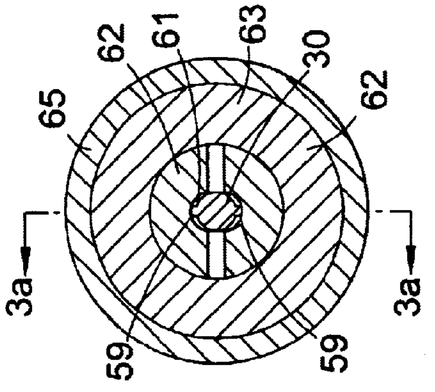
FIGS. 3*a* and 4*a*, and 3*b* and 4*b*, are respectively axial and cross sections through the pneumatic piston means.
Figure 4B:
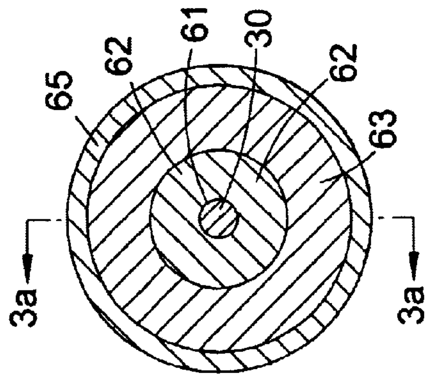
Figure 3A:
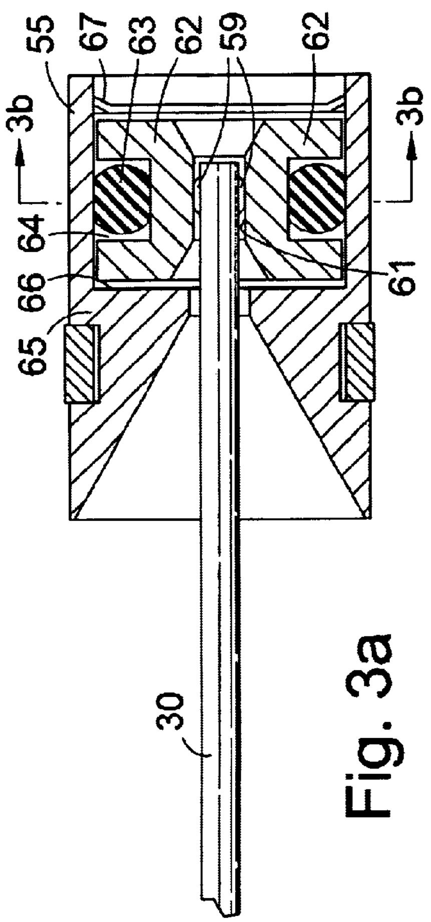
Figure 4A:
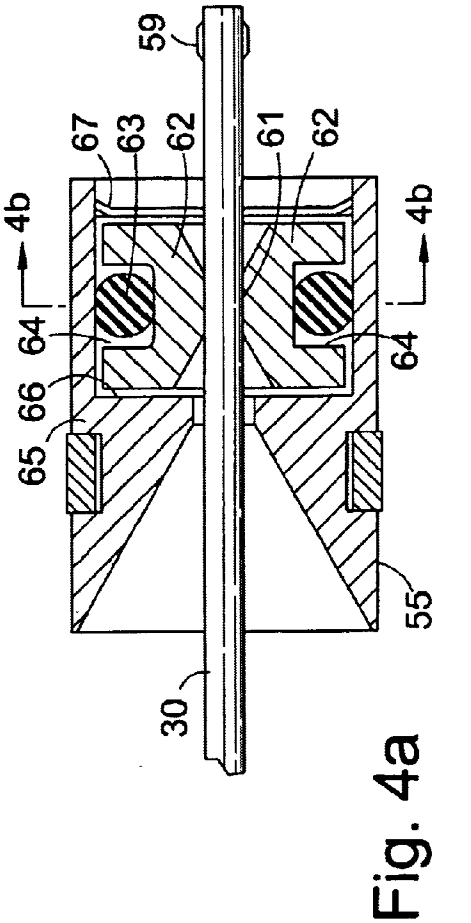

To this end, mandrel 30 is provided with a radial enlargement, which in this example is in the form of two projections 59, 59 (FIGS. 3 and 4) diametrically opposite each other and formed by a crimping operation, after the rivets 30 (and a tubular spacer described below) have been loaded on the mandrel. The crimped enlargement is positioned close to the tail end of the mandrel, because this position allows the easiest crimping operation. This enlargement prevents the escape of preloaded rivets from the tail end of the mandrel and more importantly prevents the unauthorised reloading of further rivets on to the mandrel after the original rivets have been set. It is therefore necessary to enable the enlargement 59 at the tail end of the mandrel to pass through the bore in the pneumatic rivet feed piston 55, whilst still providing when in use a sufficient air seal between the piston and the mandrel, as previously described.

This is achieved by the second important difference of the present tool over the prior art tool. As illustrated in FIGS. 3 and 4, the part of the piston means defining the bore through which the mandrel passes is temporarily radially expandable. The piston bore 61 is defined by half-bores in two generally hemi-cylindrical steel segments 62, 62 which are resiliently urged radially inwards by a O-ring seal 63 lying in an annular channel 64 around the segments 62, 62, the seal 63 projecting radially outwardly of the channel. This O-ring seal 63 also seals around the outside surface of the segments and the inside of the steel tubular shell 65, which provides the body of the piston 55. The segments 62, 62 are retained in the shell 65 between an annular shoulder 66 on the shell and a spring clip 67.

When the tail end of the mandrel is pushed into the bore 61 of the piston 55, the segments 62, 62 move slightly apart (FIGS. 3*a* and 3*b*) to allow the enlargement to pass through, and then close together behind it (FIGS. 4*a* and 4*b*) to substantially seal around the mandrel 30. Similarly, the enlargement can easily pass through the piston bore in the opposite direction when the mandrel is removed from the tool.

The invention is not restricted to the details of the foregoing example.

What is claimed is:

1. Pneumatic piston means for use in rivet feeding means in riveting apparatus having an elongated mandrel, and having an enlarged head at one end and loaded with a plurality of the tubular rivets forming a column of rivets on the mandrel, which is gripped by gripping means at or near the end remote from the head, and reciprocated relative to an abutment by relative reciprocation between the gripping means and the abutment, the rivets in the column being fed forwardly along the mandrel so that the leading rivet nearest the mandrel head is positioned between the mandrel head and the abutment and can then be set by moving the mandrel rearwardly relative to the abutment so as to draw the head of the mandrel through the bore of the rivet while the rivet is supported by the abutment, the piston means having a bore through which the mandrel extends, the mandrel having a radially enlarged part at a position on the mandrel remote from the head whereby the application of pneumatic pressure to one end of the piston means causes the piston to apply a thrust to the column of rivets thereby to feed the rivets forwardly along the mandrel as aforesaid, the part of the pneumatic piston means defining the bore being temporarily radially expandable, thereby to allow the passage through the bore of the radially enlarged part of the mandrel and to close again on to the mandrel after the passage of the enlarged part through the bore such that the piston is arranged to pass along the non-enlarged part of the mandrel whilst maintaining a fluid-tight seal with the mandrel.

2. Pneumatic piston means as claimed in clam 1, further comprising a tubular shell surrounding the radially expandable part.

3. Pneumatic piston means as claimed in claim 2, wherein the radially expandable part comprises a plurality of radially separable segments.

4. Pneumatic piston means as claimed in claim 3, wherein the radially separable segments are urged radially inwards.

5. Pneumatic piston means as claimed in claim 4, further comprising a resilient annular member which both urges the segments radially inwards and provides a pneumatic seal between them and the tubular shell.

6. Riveting apparatus comprising an elongate mandrel, having an enlarged head at one end and loadable with a plurality of tubular rivets forming a column of rivets on the mandrel, gripping means for gripping the mandrel at or near the end remote from the head, the mandrel being reciprocable relative to an abutment by relative reciprocation between the gripping means and the abutment, and the rivets in the column being feedable forwardly along the mandrel so that the leading rivet nearest the mandrel head is positioned between the mandrel head and the abutment and can then be set by moving the mandrel rearwardly relative to the abutment so as to draw the head of the mandrel through the bore of the rivet while the rivet is supported by the abutment, the apparatus further including a body having abutment means mounted at one end thereof, and stop means mounted at a position remote therefrom, so that a mandrel inserted through the abutment means has its end remote from its head located axially by the stop means in predetermined axial relationship to the body, the abutment means being adjustable with respect to the body in the direction along the mandrel axis, thereby to provide adjustment of the relative positions of the abutment and the mandrel head, and including pneumatic piston means having a bore through which the mandrel extends, the mandrel having a radially enlarged part at a position on the mandrel remote from the head whereby the application of pneumatic pressure to one end of the piston means causes the piston to apply a thrust to the column of rivets thereby to feed the rivets forwardly along the mandrel as aforesaid, the part of the pneumatic piston means defining the bore being temporarily radially expandable, thereby to allow the passage through the bore of the radially enlarged part of the mandrel and to close again on to the mandrel after the passage of the enlarged part through the bore such that the piston is arranged to pass along the non-enlarged part of the mandrel whilst maintaining a fluid-tight seal with the mandrel.

7. Riveting apparatus as claimed in claim 6, further characterized in that the abutment means is threadedly engaged with the body, thereby to provide the adjustment by relative rotation.

8. Riveting apparatus as claimed in claim 7, further characterized in that a locknut is provided for locking the abutment means in a selected position.

* * * * *